United States Patent

[11] 3,617,075

[72] Inventors Paul W. Van Horn;
Glen F. Doel, both of Los Angeles, Calif.
[21] Appl. No. 45,214
[22] Filed June 10, 1970
[45] Patented Nov. 2, 1971
[73] Assignee The United States of America as represented by the Secretary of The United States Air Force
Continuation-in-part of application Ser. No. 774,271, Nov. 8, 1968, now abandoned.

[54] QUICK DISCONNECT COUPLING SEAL
3 Claims, 3 Drawing Figs.
[52] U.S. Cl............................................. 285/13, 277/58, 277/236, 285/3, 285/112, 285/328, 285/375, 285/420, 285/DIG. 18
[51] Int. Cl...................................................... F16l 55/00
[50] Field of Search........................................... 285/13, 14, 328, 3, 375, 351, DIG. 18, 112, 379, 4 W; 277/58, 208, 236

[56] References Cited
UNITED STATES PATENTS
| 1,834,581 | 12/1931 | Ferrell et al. | 285/328 |
| 1,840,312 | 1/1932 | Dunmire | 277/236 |
| 3,107,107 | 10/1963 | Guornaschelli | 277/375 X |
| 3,207,524 | 9/1965 | Trboviuh | 277/236 |
| 3,273,918 | 9/1966 | Legarra et al. | 285/112 |

FOREIGN PATENTS
| 1,118,550 | 11/1961 | Germany | 285/14 |

Primary Examiner—Dave W. Arola
Attorneys—Harry A. Herbert, Jr. and Arsen Tashjian ABSTRACT: Quick disconnect coupling means for connecting and sealing two matching conduits having interengaging flanges with dual sealing assemblies disposed therebetween. Pivotal latching means are clamped against both flanges by axially directed pressure from a spring-loaded piston and cylinder arrangement carried by the engaged flange of one of the matching conduits.

PATENTED NOV 2 1971

INVENTORS.
PAUL W. VAN HORN
GLEN F. DOEL
BY Harry A. Herbert Jr
Arsen Tashjian and
ATTORNEYS

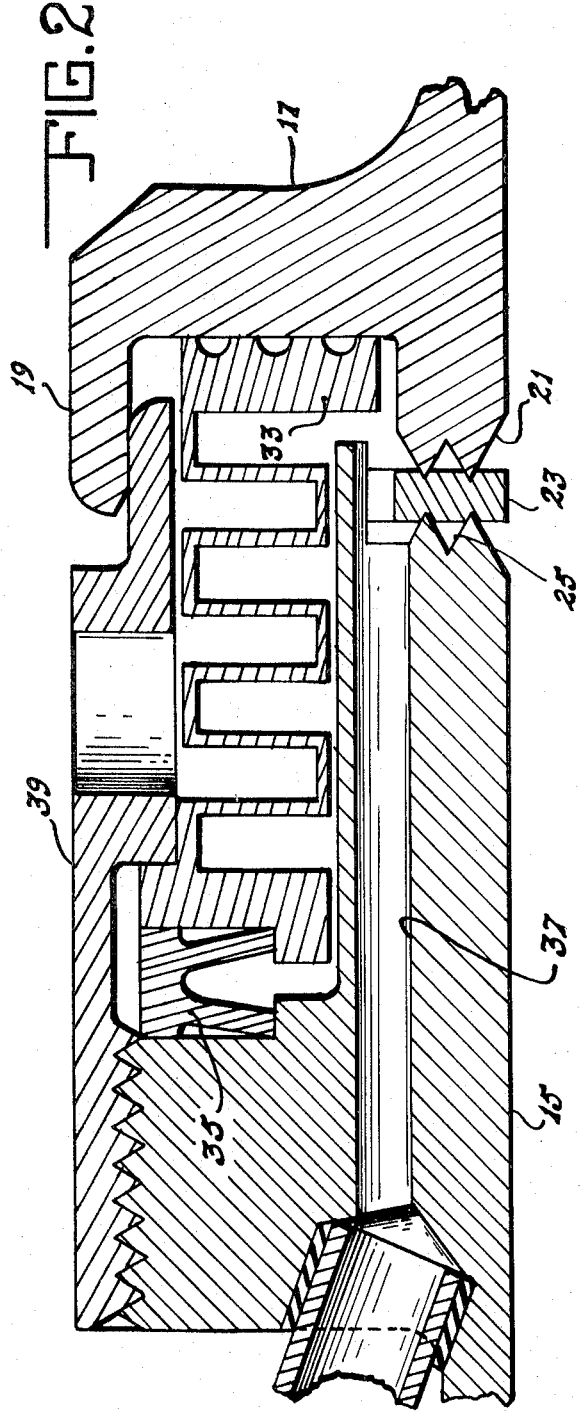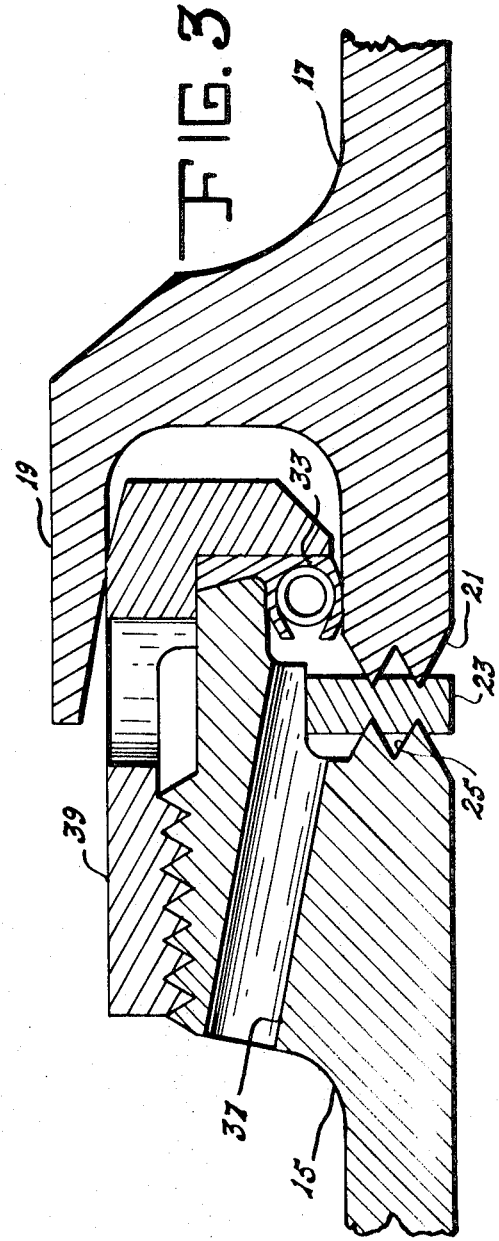

QUICK DISCONNECT COUPLING SEAL

BACKGROUND OF THE INVENTION

This application is a continuation-in-part of application Ser. No. 774,271, filed Nov. 8, 1968, and now abandoned.

This invention relates to a quick disconnect coupling and, more particularly the invention is concerned with providing a coupling capable of quickly connecting, sealing and releasing a conduit designed to carry liquid or gaseous propellants to and from spacecraft.

With the advent of space investigation, the use of cryogenic liquids as rocket fuels has become widespread. In addition to being hard to handle because of their extremely low temperatures and explosive character, some of these cryogenic liquids such as liquid fluorine are extremely corrosive and pose problems in attempting to prevent their escape during the transfer from the source of supply to the space vehicle. Since the nature of these cryogenic liquids requires that the filling of the space vehicle be performed at the last minute, the operation must generally be carried out while the said vehicle is on the launching pad.

To be effective in conducting liquids from an AGE propellant servicing line to a line on the vehicle, the connection therebetween must be effected very rapidly allowing only a negligible amount of spillage. Presently known devices fail to provide a system for controlling the flow of corrosive fluids such as liquid fluorine which is capable of connection, seal, quick disconnection and reconnection through repeated cycles with little or no spillage of the liquid during the transportation operation.

SUMMARY OF THE INVENTION

The present invention provides a quick disconnect coupling designed for use at a space vehicle launch complex for connecting an AGE propellant servicing line to a line on the vehicle to load and unload cryogenic liquids of a corrosive nature, such as liquid fluorine. The coupling is quick acting during connecting, sealing and releasing while still compatible for use with liquid fluorine allowing no significant amount of the fluorine to escape.

The liquid coupling seal herein disclosed is entirely fabricated of metal precluding leakage or other release of the corrosive liquid. Also, provisions are made for effectively draining and purging the system of fluorine while excluding moisture, ice or frost from the quick disconnect coupling. The reliable and redundant quick release mechanism provides for rapid manual engagement, latching and sealing of the coupling which is compatible with flowing liquid and gaseous fluorine.

Accordingly, it is an object of the invention to provide a quick disconnect coupling seal for connecting a source of supply of cryogenic fluid to a rocket or space vehicle.

Another object of the invention is to provide a coupling that is reliable and low in cost of manufacture while still allowing very low leakage of less than $10^{14}$ standard cubic inches per minute.

Still another object of the invention is to provide an all metal quick disconnect coupling having effective fluorine drain and purge provisions.

A further object of the invention is to provide a fluid coupling which may be employed to control the flow of corrosive cryogenic liquids and which features rapid manual engagement, latching and sealing of the coupling.

A still further object of the invention is to provide a quick disconnect coupling wherein a built-in mechanism is included for excluding moisture frost and ice from entering the connection and contaminating the liquid passing through the line.

These and other objects, features and advantages will become more apparent after considering the description that follows taken in conjunction with the attached drawings wherein like numbers are used throughout to identify like elements.

DESCRIPTION OF THE DRAWINGS

FIG. 2 is an enlarged view in cross section of a metal secondary seal design; and FIG. 3 is an enlarged view in cross section of a modified omniseal design for preventing leakage from the quick disconnect coupling.

DESCRIPTION OF A PREFERRED EMBODIMENT

Figure 1:
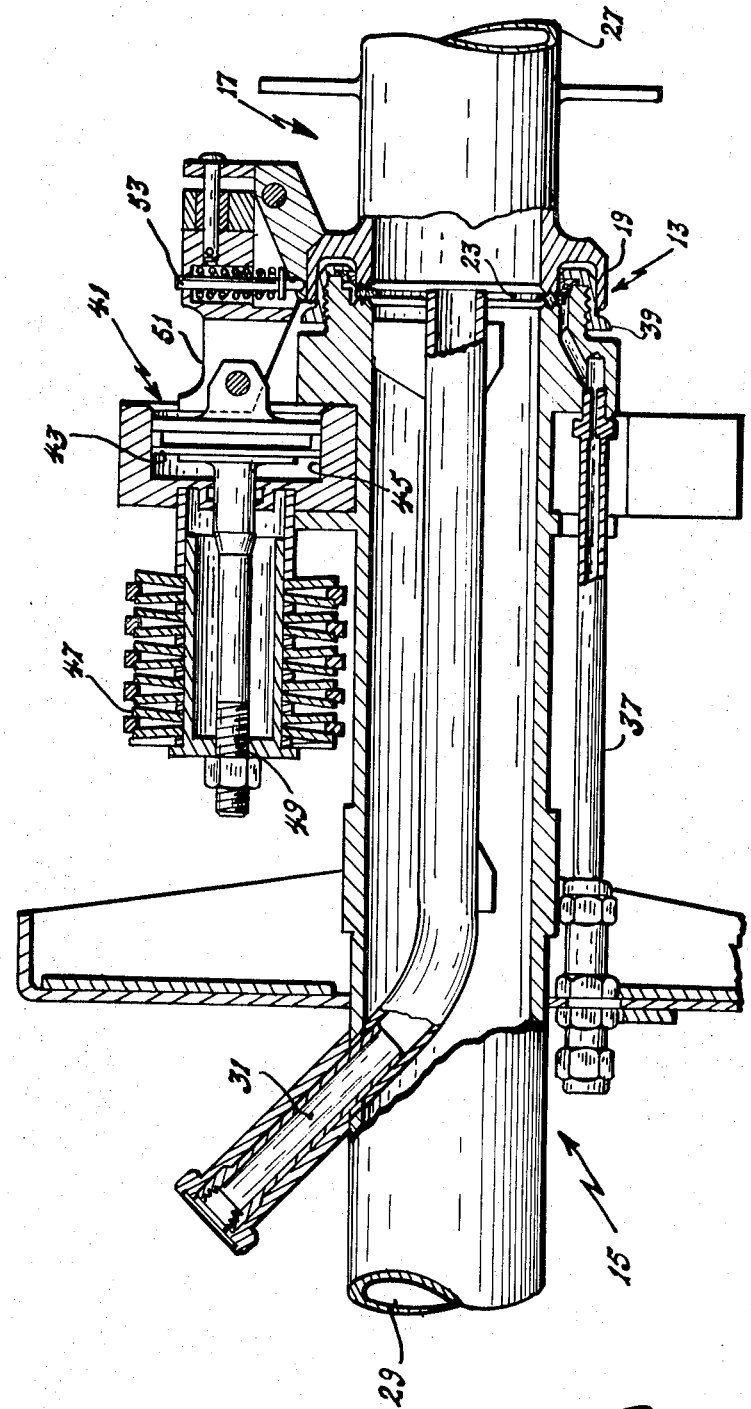
FIG. 1 is a plan view in partial cross section of a quick disconnect coupling according to the invention showing the spring-loaded piston and cylinder arrangement and latching means.

Referring now to FIG. 1, the drawing shows a coupling 13 suitable for connecting a conduit from a source of cryogenic liquid to the reservoir of a space vehicle or other apparatus that uses the liquid. The coupling 13 is capable of quick disconnection and reconnection and includes two component sections, the quick disconnect section 15 and the stationary section 17 fixed to the space vehicle. In FIG. 1, the two sections 15 and 17 are shown in a liquid and gastight relationship.

The stationary section 17 is provided with an open U-shaped portion 19 at its contact end. One of the legs of the U-shaped section 19 terminates in concentric serrations 21 which bite into the soft metal gasket 23 to form a gas-liquid primary seal therebetween. Matching serrations 25 are formed on the terminal end of the quick disconnect section 15 and these serrations 25 bite into the opposite face of the gasket 23.

Extending longitudinally and coaxially through the stationary section 17 is fluid passageway 27 through which the liquid is carried to and from the storage section of the spacecraft. A fluid passageway 29 is disposed in the quick disconnect section 15 in axial alignment with the passageway 27 allowing the cryogenic liquids to be conducted freely therebetween. Axially concentric with the main passageway 27 in the quick disconnect section 15 is a main purge line 31 which extends outwardly through the sidewall thereof for purging the system of liquid in the coupling area.

A secondary seal 33 is positioned in the area between the sections 15 and 17 for preventing leakage of any liquid which may possibly escape past the primary seal 23. FIGS. 2 and 3 illustrate two different designs suitable for use as secondary seals 33. In the design of FIG. 2 an additional bobbin type seal 35 is located between the secondary seal 33 and the quick disconnect section 15. A seal cavity purge line 37 is provided for carrying away any fluid which may leak into the area past the primary seal 23. As shown in FIGS. 2 and 3, the secondary seals 33 are held in position by the seal retainer 39.

The arrangement shown in FIG. 1 is disclosed for illustrative purposes to show a connection on which the present coupling seal can be utilized and includes a plurality of locking assemblies 41, each having a latching piston 43 in a cylinder 45, which are positioned at various clock positions on the sidewall of the quick disconnect section 15 near the connection thereof to the stationary section 17. In response to pressurization of the cylinder 45, the piston 43 and the rod 49 attached thereto, is urged outward compressing the seal load springs 47 and extending the latching hooks 51 for coupling engagement.

When the pressure in the cylinder 45 is released, the action of the seal loading springs 47 causes the pistons 43 to move inward and at the same time applies the required load in the area of the seal 23. A spring guide pin 53 keeps the latching hook 51 in position during engagement. Any suitable means, either manual or remote, may be provided for disconnecting the coupling when desired. For example, a shear pin may be loaded and caused to fail and thereby separate the two sections.

The apparatus of the instant invention may be varied in structure particularly in regard to the locking assembly 41 and the detailed structure of the overall mechanism. Important considerations are in providing an interface which is liquid and gas pressure tight and a locking mechanism which can maintain the said interface in this manner and also be capable of repeatedly effecting the formation of the interface.

Although the invention has been illustrated in the accompanying drawings and described in the foregoing specification in terms of preferred embodiments thereof, the invention is not limited to these embodiments or to the particular configurations mentioned. It will be apparent to those skilled in the art that our invention can be efficiently used for transporting other fluids or gases besides cryogenic fuels even though its optimum feature is the compatibility of the quick disconnect coupling with flowing liquid and gaseous fluorine. Also, it should be understood that various changes, alterations, modifications and substitutions, particularly with respect to the construction details, can be made in the arrangement of the several elements without departing from the true spirit and scope of the appended claims.

Having thus described our invention, what we claim as new and desire to secure by Letters Patent of the United States is:

1. A quick disconnect coupling for fueling apparatus used for supplying a space vehicle with a cryogenic liquid propellant, comprising a quick disconnect section of tubular configuration, a stationary section of tubular configuration for cooperative engagement with said quick disconnect section, said stationary section terminating at its mating end in a U-shaped configuration having axially extending radially spaced inner and outer legs with connecting wall means therebetween, concentric serrations disposed on the inner leg of the U-shaped terminal end of said stationary section, corresponding concentric serrations disposed on the mating end of said quick disconnect section, a primary seal of annular configuration positioned between and in sealing contact with the concentric serrations on said quick disconnect and said stationary sections, an elongated secondary seal extending axially outwardly from and in sealing contact with said connecting wall means, said secondary seal being bellows-shaped, a bobbin-type seal positioned between and in sealing contact with the outward end of said elongated secondary seal and the mating end of said quick disconnect section, said elongated secondary seal preventing escape of propellant that leaks past the primary seal, and locking means disposed on the sidewall of said quick disconnect section and said stationary section for retaining said stationary section in operational engagement therewith and sealing said sections by applying axial pressure therebetween to prevent leakage of propellant flowing through the sections to the space vehicle.

2. The quick disconnect coupling defined in claim 1 wherein a main purge line is positioned axially concentric within the main passageway in the quick disconnect section, the outer end of said main purge line extending angularly through the sidewall thereof to permit drainage of propellant in the fuel supply lines.

3. The quick disconnect coupling defined in claim 2 wherein a seal cavity purge line is operatively connected to the cavity area between said primary and secondary seals for draining away any leakage of propellant past said primary seal.

* * * * *